US011296486B2

(12) United States Patent
Weaver (10) Patent No.: US 11,296,486 B2
(45) Date of Patent: Apr. 5, 2022

(54) WIRE PREPARATION DEVICE

(71) Applicant: TE CONNECTIVITY CORPORATION, Berwyn, PA (US)

(72) Inventor: Brian Keith Weaver, Harrisburg, PA (US)

(73) Assignee: TE Connectivity Services GmbH

( * ) Notice: Subject to any disclaimer, the term of this patent is extended or adjusted under 35 U.S.C. 154(b) by 879 days.

(21) Appl. No.: 15/722,281

(22) Filed: Oct. 2, 2017

(65) Prior Publication Data
US 2019/0103737 A1    Apr. 4, 2019

(51) Int. Cl.
| | | |
|---|---|---|
| H02G 1/12 | (2006.01) |
| H01R 43/20 | (2006.01) |
| H01R 43/033 | (2006.01) |
| H01R 43/28 | (2006.01) |

(52) U.S. Cl.
CPC ....... *H02G 1/1292* (2013.01); *H01R 43/0335* (2013.01); *H01R 43/20* (2013.01); *H01R 43/28* (2013.01); *H02G 1/1248* (2013.01)

(58) Field of Classification Search
CPC .. H02G 1/1292; H02G 1/1265; H02G 1/1248; H02G 1/1256; H02G 1/1295; H01R 43/0335; H01R 43/20; H01R 43/28; G02B 6/245
USPC ............. 81/9.51, 9.4, 9.41, 9.42, 9.43, 9.44; 30/90.1, 90.3, 91.2
See application file for complete search history.

(56) References Cited

U.S. PATENT DOCUMENTS

| | | | | | |
|---|---|---|---|---|---|
| 3,614,905 | A | * | 10/1971 | Bieganski ............ | H02G 1/1265 81/9.51 |
| 3,685,271 | A | * | 8/1972 | Wall ...................... | D07B 3/085 57/68 |
| 3,795,159 | A | | 3/1974 | Steiner et al. | |
| 3,853,156 | A | * | 12/1974 | Folkenroth .......... | H02G 1/1292 140/149 |

(Continued)

FOREIGN PATENT DOCUMENTS

| | | |
|---|---|---|
| CN | 20032330400 U | 10/2013 |
| CN | 106451251 A | 2/2017 |
| CN | 106981343 A | 7/2017 |

OTHER PUBLICATIONS

International Search Report, International Application No. PCT/IB2018/057607, International Filing Date Oct. 1, 2018.

(Continued)

*Primary Examiner* — Monica S Carter
*Assistant Examiner* — Marcel T Dion (57) ABSTRACT

A wire preparation device includes a motor, a device housing coupled to the motor, and a wire spinner held by the device housing. The wire spinner is mechanically connected to the motor via power coupling components. The wire spinner extends to a wire end that protrudes from the device housing. The wire spinner includes a collet sleeve defining a channel configured to receive an end of one or more wires of a cable therein through an opening at the wire end. The wire spinner further includes an outer collar surrounding the collet sleeve and selectively movable relative to the collet sleeve to force the collet sleeve to contract radially inward for releasably securing the one or more wires within the channel. The wire spinner is rotated by the motor relative to the device housing to untwist or straighten the one or more wires secured within the collet sleeve.

20 Claims, 8 Drawing Sheets

(56) References Cited

U.S. PATENT DOCUMENTS

| | | | | |
|---|---|---|---|---|
| 4,067,403 | A | * | 1/1978 | Richmond ......... A61B 17/1697 173/213 |
| 4,196,510 | A | * | 4/1980 | Gudmestad ............ H01R 43/28 29/867 |
| 4,261,230 | A | * | 4/1981 | Sindelar ............... H02G 1/1248 81/9.51 |
| 4,720,912 | A | * | 1/1988 | Frohlich .............. H01R 43/055 29/753 |
| 5,253,315 | A | * | 10/1993 | Fentress ............... G02B 6/3869 385/76 |
| 5,467,804 | A | * | 11/1995 | Kupferschmidt ....... B21F 11/00 140/115 |
| 5,896,787 | A | * | 4/1999 | DeVincentis .......... G02B 6/245 81/9.41 |
| 7,104,287 | B1 | | 9/2006 | Schmitz |
| 8,555,933 | B2 | | 10/2013 | Houser et al. |
| 2006/0179908 | A1 | * | 8/2006 | Braun .................... H01R 43/28 72/77 |
| 2006/0242839 | A1 | * | 11/2006 | Landes ................ H02G 1/1221 30/90.4 |
| 2007/0283559 | A1 | * | 12/2007 | Jackson .................... B21F 7/00 29/748 |
| 2012/0167719 | A1 | * | 7/2012 | Newman .............. H01B 15/006 81/9.51 |
| 2012/0227858 | A1 | | 9/2012 | Kean et al. |
| 2016/0306126 | A1 | * | 10/2016 | Verheyden ............ G02B 6/3898 |

OTHER PUBLICATIONS

Chinese Search Report First Office Action Chinese Application No. 201880064284.7 dated Oct. 9, 2020.

* cited by examiner

WIRE PREPARATION DEVICE

BACKGROUND OF THE INVENTION

The subject matter herein relates generally to wire preparation devices that are used for preparing the ends of wires of a cable for subsequent processing of the wires.

Cables in the telecommunications, electronics and computer industries utilize shielded and unshielded twisted wires. The wires are typically terminated to an electrical connector or terminal provided at an end of the cable via one or more processing operations. To prepare the wires for termination, the twisted wires are exposed and portions of the wires are untwisted and straightened. The individual wires are then terminated to the electrical connector or terminal via crimping, soldering, or the like.

Common examples of such cables typically include one or more twisted pairs of wires that must be exposed, untwisted, and straightened before being properly terminated. A traditional method for untwisting the twisted pairs is untwisting the wires by hand. Manual untwisting is slow, can irritate the skin, and does not effectively straighten the wires. For example, merely separating a twisted pair of wires from one another may not also straighten the wires due to a "twist memory" in the wire material. Another known method for untwisting the wires is known as the "pick method," which entails a user placing a metal or plastic awl between the length of twisted wires and moving the awl toward the distal ends of the wires. The pick method includes several drawbacks, including that the awl may damage the wires, the pick method cannot untwist all types of wires, and also may not straighten the wires.

A need remains for a device that untwists and straightens twisted pairs of wires easily, efficiently, and reliably.

BRIEF DESCRIPTION OF THE INVENTION

In an embodiment, a wire preparation device is provided that includes a motor, a device housing, and a wire spinner. The device housing has a front end, and is coupled to the motor rearward of the front end. The wire spinner is held by the device housing and mechanically connected to the motor via power coupling components. The wire spinner extends to a wire end that protrudes from the front end of the device housing. The wire spinner includes a collet sleeve defining a channel configured to receive an end of one or more wires of a cable therein through an opening at the wire end. The wire spinner further includes an outer collar surrounding the collet sleeve and movable relative to the collet sleeve between a retracted position and an actuated position. The outer collar in the actuated position forces the collet sleeve to contract radially inward to releasably secure the one or more wires within the channel. The wire spinner is configured to be rotated by the motor relative to the device housing to untwist the one or more wires of the cable that are releasably secured within the collet sleeve.

In an embodiment, a wire preparation device is provided that includes a device housing, power coupling components, and multiple wire spinners. The device housing has a front end, and is configured to couple to a motor rearward of the front end. The power coupling components are configured to mechanically connect to the motor. The multiple wire spinners are held by the device housing and mechanically connected to the power coupling components. The wire spinners have respective wire ends that protrude from the front end of the device housing at spaced apart locations along the front end. The wire spinners each include a collet sleeve defining a channel that is open at the wire end and configured to receive an end of one or more wires of a cable therein. Each wire spinner further includes an outer collar surrounding the respective collet sleeve and movable relative to the collet sleeve between a retracted position and an actuated position. The outer collar moving towards the actuated position forces the collet sleeve to contract radially inward, reducing the size of the respective channel, to releasably secure the one or more wires within the respective channel. The wire spinners are configured to be rotated relative to the device housing by the motor via the power coupling components to one or more of untwist or straighten the one or more wires of the cable that are releasably secured within one or more of the collet sleeves.

DETAILED DESCRIPTION OF THE INVENTION

Figure 1:
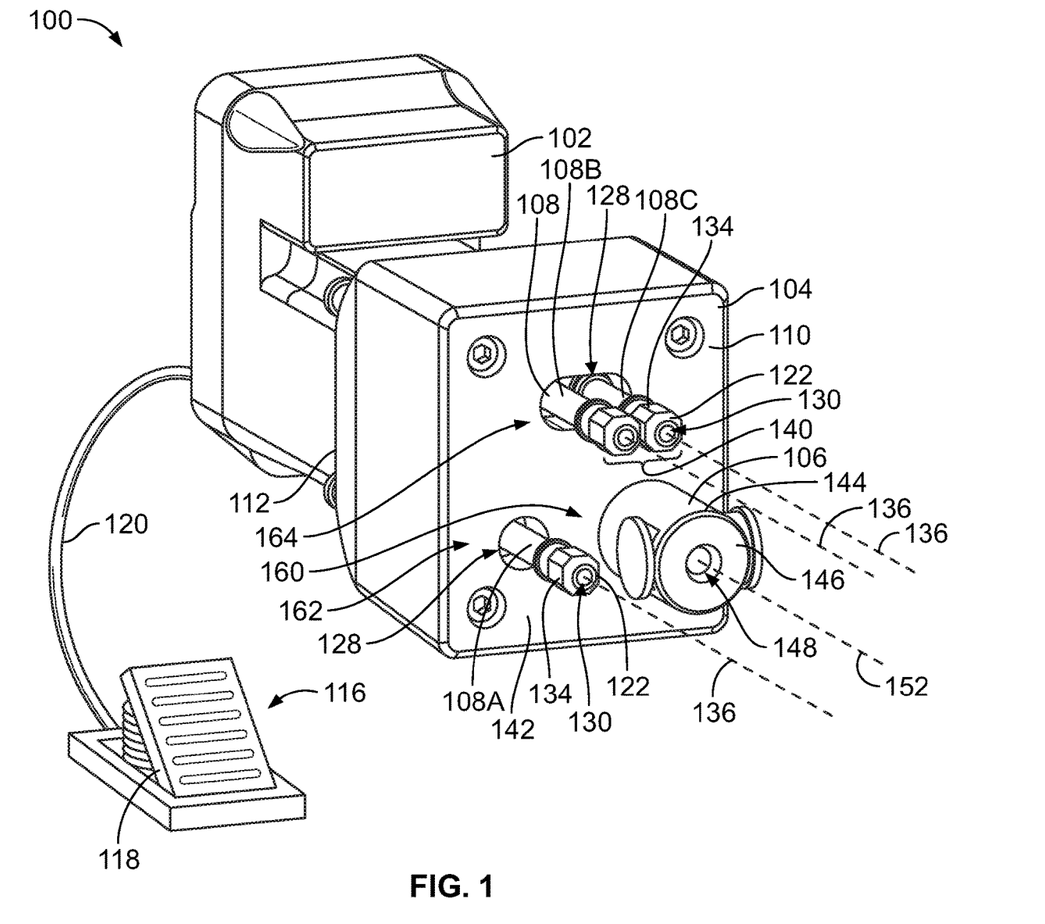
FIG. 1 is a front perspective view of a wire preparation device formed in accordance with an embodiment.

FIG. 1 is a front perspective view of a wire preparation device 100 formed in accordance with an embodiment. The wire preparation device 100 includes a motor 102, a device housing 104, and multiple wire preparation stations held by the device housing 104. The wire preparation stations in the illustrated embodiment include a jacket stripping station 160, a twisted pair untwisting station 162, and a wire straightening station 164. The stations 160, 162, 164 are defined by multiple wire spinners 108 and a jacket stripper 106. The wire spinners 108 and the jacket stripper 106 are configured to perform specific processing operations on an electrical cable 114 (shown in FIG. 2A), which are described in more detail below with reference to FIGS. 2A-2C. The wire spinners 108 and the jacket stripper 106 are mechanically connected to the motor 102 within the device housing 104, and are rotated by the motor 102 relative to the device housing 104. For example, the wire preparation device 100 further includes power coupling components 124 (shown in FIG. 3) within the device housing 104 that mechanically connect the wire spinners 108 and the jacket stripper 106 to the motor 102. The wire preparation device 100 may be a benchtop machine that is mountable on a table or workbench (not shown). The wire preparation device 100 may be portable, having a relatively small size and weight (e.g., less than ten pounds).

The device housing 104 includes a front end 110 and an opposite, rear end 112. As used herein, relative or spatial terms such as "front," "rear," "top," "bottom," "upper," and "lower" are only used to distinguish the referenced elements of the wire preparation device 100 and do not necessarily require particular positions or orientations relative to gravity and/or relative to the surrounding environment of the wire preparation device 100. The motor 102 is coupled to the device housing 104 rearward of the front end 110. The device housing 104 includes a panel 142 at the front end 110. In the illustrated embodiment, the motor 102 is coupled to the rear end 112 of the device housing 104, but may be coupled to another portion of the device housing 104 in an alternative embodiment. The motor 102 in an embodiment is a stepper motor that is configured to provide a full rotation of a drive shaft 126 (shown in FIG. 3). The motor 102 divides the rotation of the drive shaft into a number of equal steps. The motor 102 is controllable by an operator via a manually-operated switch 116. For example, the switch 116 controls activation and deactivation of the motor 102. In an alternative embodiment, the switch 116 also controls a speed of the motor 102. In the illustrated embodiment, the switch 116 is a foot pedal 118 that is electrically connected to the motor 102 via an electrical wire 120. The wire preparation device 100 may not be drawn to scale in FIG. 1, such that the foot pedal 118 may have a larger size relative to the motor 102 than the illustrated foot pedal 118 in FIG. 1.

The wire spinners 108 each have similar structures. For example, each wire spinner 108 extends to a respective wire end 122 that protrudes out of the device housing 104 beyond the front end 110. Each wire spinner 108 extends through a port opening 128 defined in the panel 142. The wire spinners 108 each include a channel 130 that is open at the wire end 122. The channels 130 are configured to receive one or more wires 132 (shown in FIG. 2A) of the cable 114 therein. The wire spinners 108 each include a collet assembly 134 at the wire end 122. The collet assembly 134 provides a gripping mechanism for releasably securing the one or more wires 132 within the respective channel 130. For example, the collet assembly 134 is actuated manually for loading and unloading the one or more wires 132. In an embodiment, the collet assemblies 134 of the wire spinners 108 are spring-loaded and biased towards gripping the one or more wires 132 to secure the one or more wires 132 within the channel 130.

The wire spinners 108 are each oriented along a respective spinning axis 136. The wire spinners 108 are configured to rotate about the respective spinning axes 136 relative to the device housing 104. For example, when one or more wires 132 are secured within the channel 130 of one of the wire spinners 108, rotation of that wire spinner 108 by the motor 102 causes the one or more wires 132 within the channel 130 to rotate or spin relative to a portion of the cable 114 (shown in FIG. 2A) held remote from the wire preparation device 100. The direction of rotation of the wire spinners 108 is controlled to be opposite a twist direction at which the one or more wires 132 are twisted within the cable 114, such that the spinning of the one or more wires 132 untwists and/or straightens the one or more wires 132. In the illustrated embodiment, the wire spinners 108 extend parallel to each other (e.g., the spinning axes 136 are parallel to one another).

In the illustrated embodiment, the wire preparation device 100 includes three wire spinners 108, including an untwisting wire spinner 108A and two straightening wire spinners 108B, 108C. The two straightening wire spinners 108B, 108C are disposed side-by-side in a pair 140 along the panel 142 at the front end 110 of the device housing 104. The untwisting wire spinner 108A is spaced apart from the pair 140 of straightening wire spinners 108B, 108C along the panel 142. The two straightening wire spinners 108B, 108C and the untwisting wire spinner 108A represent two different processing stations, as described below with reference to FIGS. 2B and 2C.

The jacket stripper 106 includes a cylindrical housing 144 that protrudes through the panel 142 beyond the front end 110 of the device housing 104 at a spaced apart location from the three wire spinners 108A-C. The jacket stripper 106 represents a different processing station than the wire spinners 108A-C. Therefore, the wire preparation device 100 in the illustrated embodiment includes three discrete processing stations incorporated into the device housing 104. The cylindrical housing 144 extends to a cable end 146, and defines a socket 148 that is open at the cable end 146. The cylindrical housing 144 is configured to receive an intact end 150 (shown in FIG. 2A) of the cable 114 in the socket 148. The cylindrical housing 144 extends along a longitudinal axis 152, and is configured to be rotated by the motor 102 about the longitudinal axis 152. The longitudinal axis 152 may be parallel to the spinning axes 136 of the wire spinners 108.

Figure 2A:
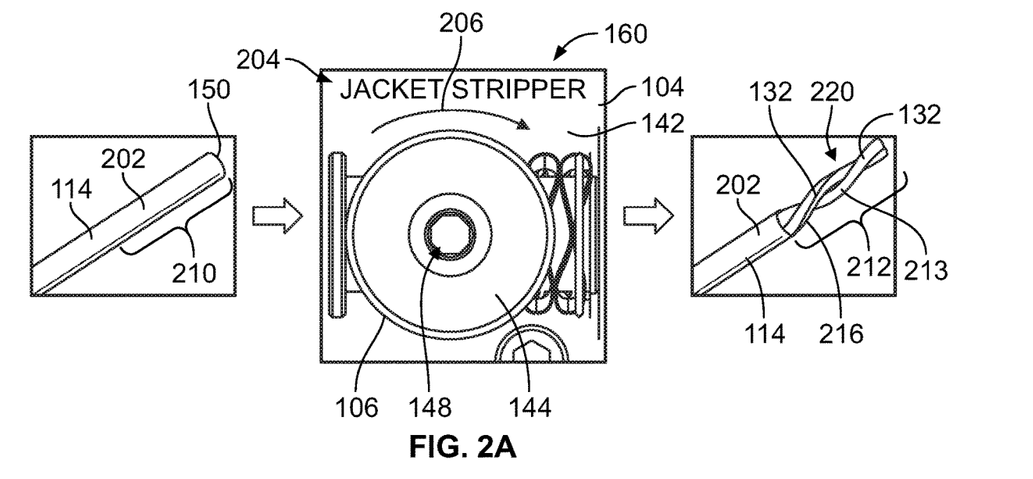
FIG. 2A illustrates a front view of a portion of the wire preparation device showing a jacket stripping station thereof, according to an embodiment.
Figure 2B:
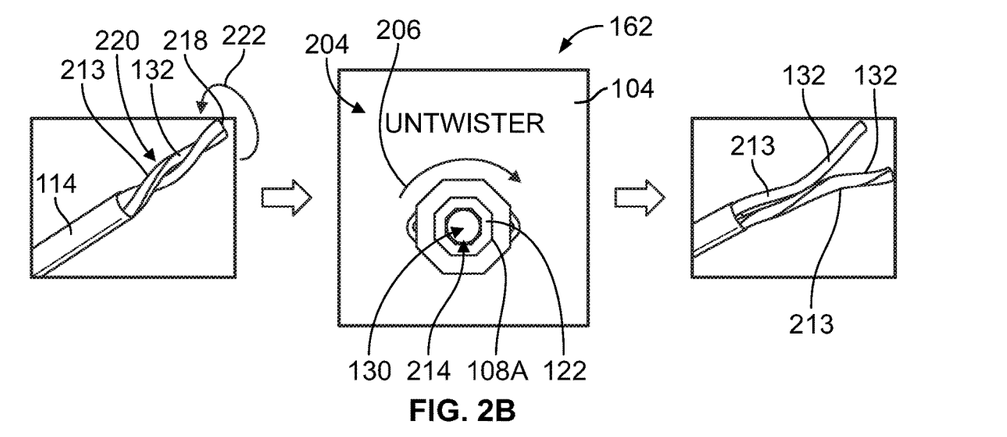
FIG. 2B illustrates a front view of another portion of the wire preparation device showing a twisted pair untwisting station thereof, according to an embodiment.
Figure 2C:
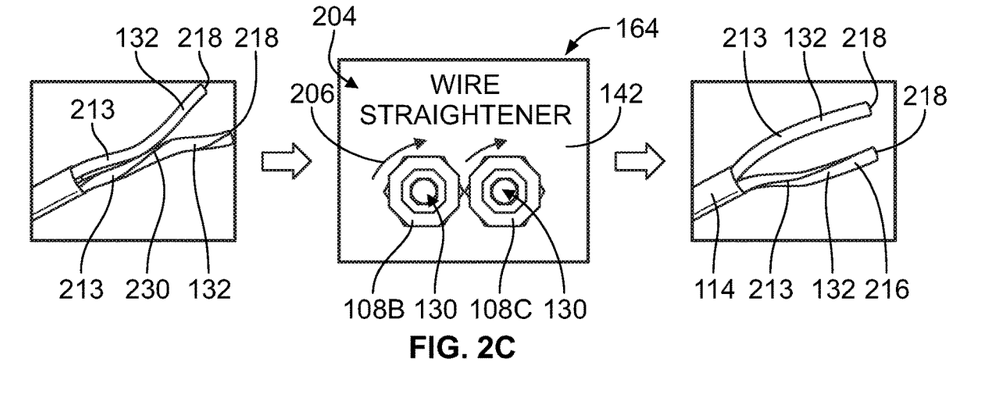
FIG. 2C illustrates a front view of another portion of the wire preparation device showing a wire straightening station thereof, according to an embodiment.

FIGS. 2A-2C illustrate front views of portions of the wire preparation device 100 (shown in FIG. 1) showing the jacket stripping station 160, the twisted pair untwisting station 162, and the wire straightening station 164, respectively, according to an embodiment. Optionally, the wire preparation device 100 may include labels 204 on the panel 142 that identify the stations 160, 162, 164, such as "Jacket Stripper," "Untwister," and "Wire Straightener." Furthermore, the panel 142 optionally includes arrows 206 that indicate rotation directions of the jacket stripper 106 and the wire strippers 108. Although the wire preparation device 100 includes the three stations 160, 162, 164 in the illustrated embodiment, in other embodiments the wire preparation device 100 may include only one or two of the stations 160, 162, 164. Furthermore, the wire preparation device 100 in other embodiments may include one or more stations that differ from the stations 160, 162, 164, either in addition to the three stations 160, 162, 164 or instead of one or two of the stations 160, 162 164.

Referring first to FIG. 2A, the jacket stripping station 160 includes the jacket stripper 106. The socket 148 of the cylindrical housing 144 has a size and dimension that accommodates the end 150 of a cable 114 therein. The end 150 of the cable 114 received within the socket 148 is unstripped or intact, such that the end 150 includes a cable jacket 202 that surrounds multiple wires 132.

In the illustrated embodiment, to prepare the wires 132 of the cable 114 for subsequent termination to an electrical terminal and/or electrical connector, an operator loads the unstripped end 150 of the cable 114 into the socket 148.

Although not shown, the cylindrical housing 144 contains a blade 208 (shown in FIG. 8) within the socket 148 that engages the cable jacket 202. After the cable 114 is loaded into the socket 148 and engaged by the blade 208, the operator activates the motor 102 (shown in FIG. 1) via the switch 116 (FIG. 1), and the jacket stripper 106 rotates relative to the device housing 104. In an embodiment, a portion of the cable 114 outside of the socket 148 is held in a fixed rotational position, such as by the operator manually holding the cable 114. The fixed portion of the cable 114 outside of the socket 148 provides a torsional force that resists the end 150 of the cable 114 from rotating with the jacket stripper 106. As a result, the jacket stripper 106 rotates relative to the end 150 of the cable 114, and the blade 208 traverses an outer perimeter of the cable 114. The jacket stripper 106 may rotate in a clockwise or counter-clockwise direction to strip the cable jacket 202. Although the arrow 206 above the jacket stripper 106 in FIG. 2A indicates that the jacket stripper 106 rotates clockwise, the jacket stripper 106 may rotate counter-clockwise in an alternative embodiment.

Once the blade 208 moves along the entire perimeter of the cable 114, the blade 208 may sever a distal segment 210 of the cable jacket 202 from the remainder of the cable 114. Thus, an operator may activate the motor 102 to provide at least one revolution of the jacket stripper 106 in order to sever the distal segment 210. Afterwards, the operator can remove the cable 114 from the socket 148 and pull the distal segment 210 of the cable jacket 202 from the cable 114 to yield a stripped end portion 212 of the cable 114. The removed distal segment 210 of the cable jacket 202 can be discarded.

In an embodiment, the cable 114 is a twisted pair electrical cable including a twisted pair 220 of wires 132 twisted around each other and commonly surrounded by the cable jacket 202. The two wires 132 in the twisted pair 220 are insulated wires with an insulation layer 216 surrounding a metal core (not shown). The cable 114 may be a high speed cable 114 that transmits data signals at speeds over 10 gigabits per second (Gbps), such as over 25 Gbps. Optionally, the cable 114 may be configured to transmit low speed data signals and/or power. In an alternative embodiment, the cable 114 may be an optical cable that includes one or more twisted optical fibers instead of insulated wires. In another alternative embodiment, the cable 114 may include at least one insulated electrical wire and at least one optical fiber within the jacket 202. Although not shown, the cable 114 may include additional elements, such as a conductive shield layer (e.g., a metal braid and/or a metal foil) between the wires 132 and the jacket 202. The stripped end portion 212 of the cable 114 includes exposed segments 213 of the twisted wires 132 that are not surrounded by the cable jacket 202.

Referring now to FIG. 2B, the twisted pair untwisting station 162 includes the untwisting wire spinner 108A. After the jacket stripping process, the twisted pair 220 of wires 132 is loaded into the channel 130 of the wire spinner 108A through an opening 214 at the wire end 122. The channel 130 of the wire untwisting spinner 108A has a size and dimension that accommodates ends 218 of each of the wires 132 in the twisted pair 220 therein at the same time. Once the ends 218 of the wires 132 are secured within the channel 130 of the wire untwisting spinner 108A by an operator, the operator may once again activate the motor 102 (shown in FIG. 1) to rotate the untwisting wire spinner 108A relative to the device housing 104. The untwisting wire spinner 108A is controlled to rotate in a direction that is opposite to a twisting direction of the twisted pair 220. For example, in the illustrated embodiment the two wires 132 in the twisted pair 220 are helically twisted or wrapped around each other in a counter-clockwise direction 222. In order to un-twist the two wires 132, the wire spinner 108A is rotated in the clockwise direction (as indicated by the arrow 206 above the wire spinner 108A). As the wire spinner 108A rotates, a portion of the cable 114 outside of the channel 130 is held in a fixed position and rotational orientation, such as by the operator holding the cable 114. Therefore, the ends 218 of the wires 132 rotate with the wire spinner 108A relative to the fixed portion of the cable 114. The number of revolutions of the wire spinner 108A needed to separate the exposed segments 213 of the wires 132 depends on the number of twists of the wires 132 along the stripped end portion 212. In the illustrated embodiment, approximately one revolution of the wire spinner 108A separates the exposed segments 213 of the wires 132 from one another.

Reference is now made to FIG. 2C, which shows that the wire straightening station 164 includes the straightening wire spinners 108B, 108C, which are disposed adjacent to each other along the panel 142. After the exposed segments 213 of the wires 132 are separated from each other, the wires 132 typically retain a twisted orientation and do not extend linearly. For example, one of the wires 132 in FIG. 2C includes a line 230 that appears helical due to the wire 132 being twisted along its length. It may be difficult to terminate a wire that is twisted and/or curved, so the straightening wire spinners 108B, 108C are configured to straighten and untwist the individual wires 132.

The straightening wire spinners 108B, 108C may be identical to each other. The channels 130 of the straightening wire spinners 108B, 108C each have a size and dimension that accommodates the end 218 of only one of the two wires 132 therein. Thus, the channels 130 of the straightening wire spinners 108B, 108C may be smaller than the channel 130 of the untwisting wire spinner 108A that accommodates both wires 132 in the twisted pair 220. Due to the proximity of the straightening wire spinners 108B, 108C, the ends 218 of the both wires 132 can be loaded into the channels 130 at the same time, such that one wire 132 is inserted into one channel 130 and the other wire 132 is inserted into the other channel 130. Once the wires 132 are secured within the corresponding channels 130, the operator can activate the motor 102 (shown in FIG. 1), which rotates the straightening wire spinners 108B, 108C at the same time. As described above, the operator or another device may hold a portion of the cable 114 outside of the straightening wire spinners 108B, 108C in a fixed position while the ends 218 of the wires 132 are being rotated. The straightening wire spinners 108B, 108C are rotated in the same direction as one another. Like the untwisting wire spinner 108A, the straightening wire spinners 108B, 108C are rotated in a direction that is opposite to the twisting direction of the twisted pair 220. For example, the helical line 230 on the wire 132 shows that the wire 132 is twisted in the counter-clockwise direction, so rotation of the straightening wire spinners 108B, 108C in the clockwise direction can remove or at least reduce the amount of "twist memory" along the exposed segments 213 of the wires 132.

As shown in FIG. 2C, after deactivating the motor 102 and removing the wires 132 from the straightening wire spinners 108B, 108C, the exposed segments 213 of the wires 132 are less twisted and more linear than the exposed segments prior to loading into the straightening wire spinners 108B, 108C. As shown in FIGS. 2A-2C, the wire preparation device 100 (shown in FIG. 1) provides three different processing operations, jacket stripping, twisted wire untwisting, and wire straightening, in one device. After straightening the wires 132, the cable 114 is ready for additional processing. For example, the cable 114 may be subsequently presented to another machine or device for cutting the ends 218 of the wires 132 and/or stripping the insulation 216 at the ends 218 of the wires 132.

Figure 3:
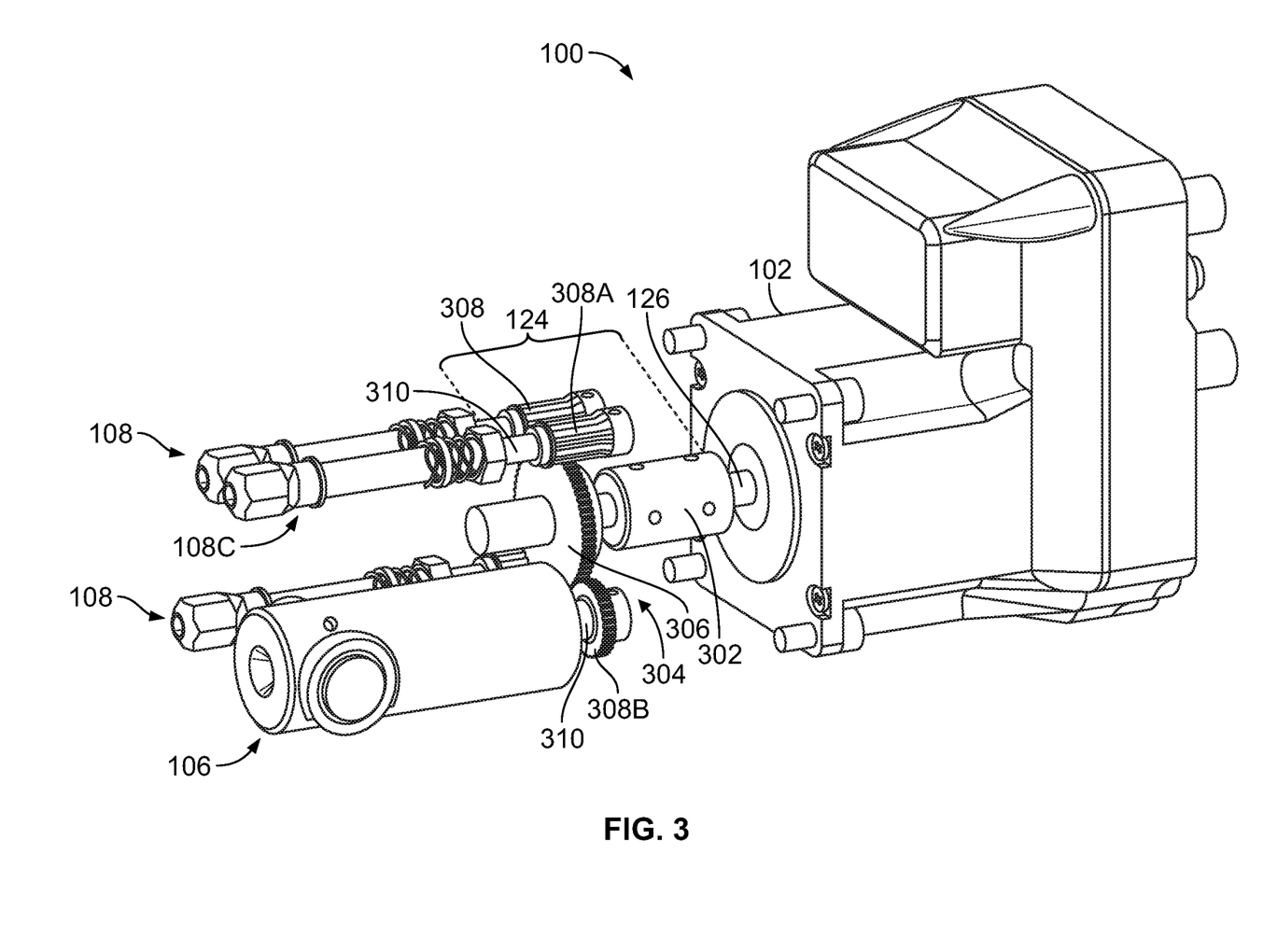
FIG. 3 is a perspective side view of the wire preparation device according to an embodiment, showing the wire preparation device without a device housing.

FIG. 3 is a perspective side view of the wire preparation device 100 according to an embodiment, showing the wire preparation device 100 without the device housing 104. The device housing 104 is omitted to show the power coupling components 124 of the wire preparation device 100 that are held within the device housing 104. The power coupling components 124 are mechanical linkages that mechanically connect the wire spinners 108 and the jacket stripper 106 to the motor 102. For example, the power coupling components 124 include a motor coupler 302 that engages the drive shaft 126 of the motor 102. The power coupling components 124 also include a gear set 304 that is used to distribute power to each of the wire spinners 108 and the jacket stripper 106. The gear set 304 includes a driver gear 306 and multiple follower gears 308 that are individually intermeshed with the driver gear 306. The motor coupler 302 is mechanically connected between the motor 102 and the driver gear 306.

Each of the follower gears 308 is fixed or secured to a corresponding output shaft 310, such that rotation of the follower gears 308 causes the output shafts 310 to also rotate. The output shafts 310 are connected to the wire spinners 108 and the jacket stripper 106. For example, a first follower gear 308A is mechanically connected to the wire spinner 108C via one output shaft 310, and a second follower gear 308B is mechanically connected to the jacket stripper 106 via another output shaft 310.

When the motor 102 is operating, rotation of the drive shaft 126 rotates the motor coupler 302. The rotation of the motor coupler 302 rotates the wire spinners 108 and the jacket stripper 106 via the gear set 304. For example, rotation of the driver gear 306 via the motor coupler 302 causes the follower gears 308 and the output shafts 310 to rotate. In an embodiment, all of the wire spinners 108 and the jacket stripper 106 are powered by the single drive shaft 126 of the motor 102 without requiring multiple power sources for different processing operations. Thus, the jacket stripping operation and the wire straightening operations are both powered by the single motor 102. Furthermore, the power coupling components 124 may be configured such that operation of the motor 102 causes all of the wire spinners 108 and the jacket stripper 106 to rotate at the same time. Optionally, the power coupling components 124 may include a switch (not shown) configured to temporarily disconnect one or more of the wire spinners 108 or the jacket stripper 106 from the mechanical connection with the driver gear 306, such that less than all of the wire spinners 108 and the jacket stripper 106 rotate when the motor 102 is operating. Optionally, at least some of the follower gears 308 may have different gear ratios with the driver gear 306, which causes the associated wire spinners 108 and/or jacket stripper 106 to spin at different speeds. For example, the first follower gear 308A may have fewer teeth than the second follower gear 308B, so the wire spinner 108C connected to the first follower gear 308A may spin faster than the wire stripper 106 connected to the second follower gear 308B.

Figure 4:
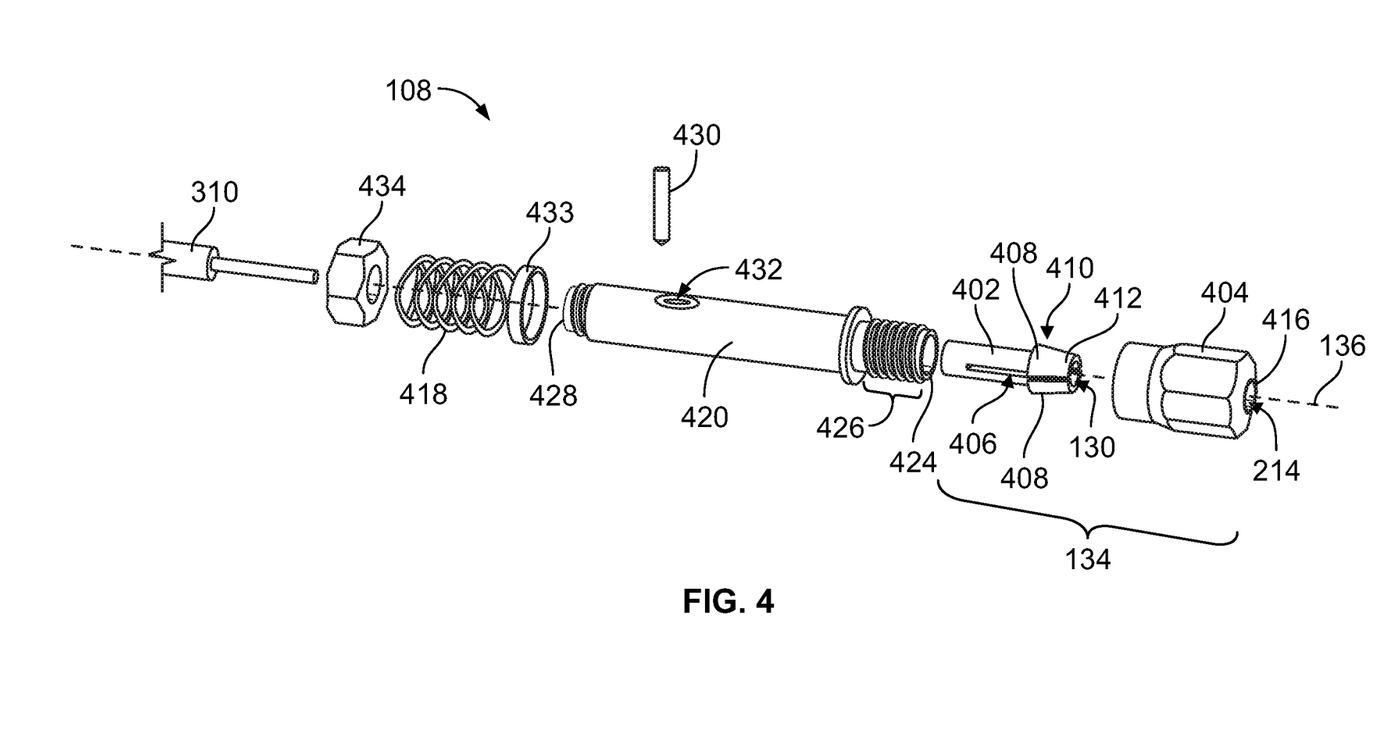
FIG. 4 is an exploded perspective view of a wire spinner of the wire preparation device according to an embodiment.

FIG. 4 is an exploded perspective view of one of the wire spinners 108 according to an embodiment. The wire spinner 108 may be either of the wire spinners 108A, 108B, 108C shown in FIG. 1. The components of the wire spinner 108 are spread along the spinning axis 136. The collet assembly 134 of the wire spinner 108 provides the gripping mechanism for quickly loading at least one of the wires 132 (shown in FIG. 2B) into the channel 130, securing the at least one wire 132, and subsequently releasing the at least one wire 132. The collet assembly 134 includes a collet sleeve 402 and an outer collar 404.

The collet sleeve 402 defines the channel 130. The collet sleeve 402 is segmented by multiple axial kerf cuts 406 that are spaced apart along a circumference of the collet sleeve 402 to define multiple cantilevered arms 408. The cantilevered arms 408 define a distal tip 410 of the collet sleeve 402 that extends to a front end 412 of the sleeve 402. The size of the channel 130 along the distal tip 410 is affected by the spacing between the cantilevered arms 408. The collet sleeve 402 has a conical outer perimeter along the distal tip 410. In the illustrated embodiment, the outer perimeter tapers towards the front end 412, but in an alternative embodiment the outer perimeter may gradually increase towards the front end 412.

The outer collar 404 surrounds the collet sleeve 402 and is movable relative to the collet sleeve 402 between a retracted position and an actuated position. The outer collar 404 includes an interior cavity 414 (shown in FIG. 5) that houses the collet sleeve 402. The outer collar 404 defines the opening 214 of the wire spinner 108 at a front end 416 of the outer collar 404. In the illustrated embodiment, the outer collar 404 is mechanically connected to a coil spring 418 via a release shaft 420. The coil spring 418 applies a biasing force on the outer collar 404 relative to the collet sleeve 402. The outer collar 404 is configured to be fixed to a front end 424 of the shaft 420 via a threaded segment 426 in the illustrated embodiment, but may be fixed to the shaft 420 via an adhesive or a fastener in another embodiment. The release shaft 420 is hollow and surrounds a portion of the collet sleeve 402 when the wire spinner 108 is assembled. The output shaft 310 is received within the release shaft 420 through a rear end 428 thereof, and is fixedly secured to the collet sleeve 402 within the release shaft 420 via a threaded connection, an adhesive, or a fastener. Therefore, rotation of the output shaft 310 causes the collet sleeve 402 to rotate.

Figure 5:
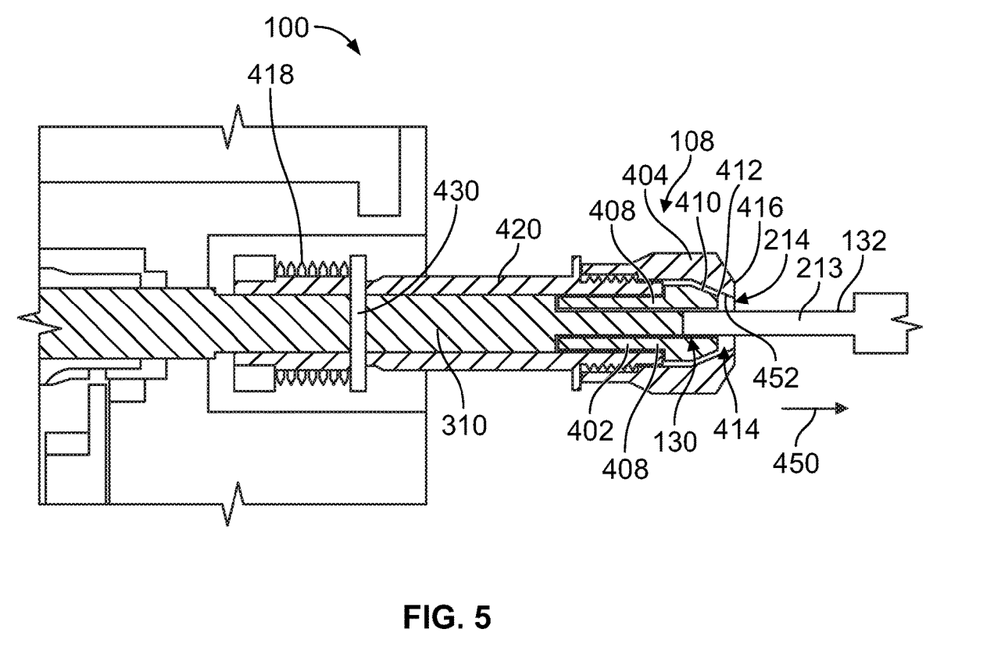
FIG. 5 is a side cross-sectional view of a portion of the wire preparation device showing a wire being loaded into a channel of one of the wire spinners according to an embodiment.

In the illustrated embodiment, the wire spinner 108 includes a pin 430 that extends through a slot 432 in the release shaft 420 and secures to the output shaft 310 within the release shaft 420 (as shown in FIG. 5). The pin 430 is therefore fixed relative to the output shaft 310. The slot 432 is elongated to allow the release shaft 420 to move axially relative to the pin 430 (and both the output shaft 420 and the collet sleeve 402). The coil spring 418 surrounds the release shaft 420 and is held between an annular ring 433 and a nut 434. The nut 434 threadably connects to the rear end 428 of the release shaft 420. The annular ring 433 engages the pin 430. In an embodiment, the coil spring 418 is configured to exert an axial spring force on the release shaft 420 relative to the pin 430, which biases the outer collar 404 relative to the collet sleeve 402.

Figure 6:
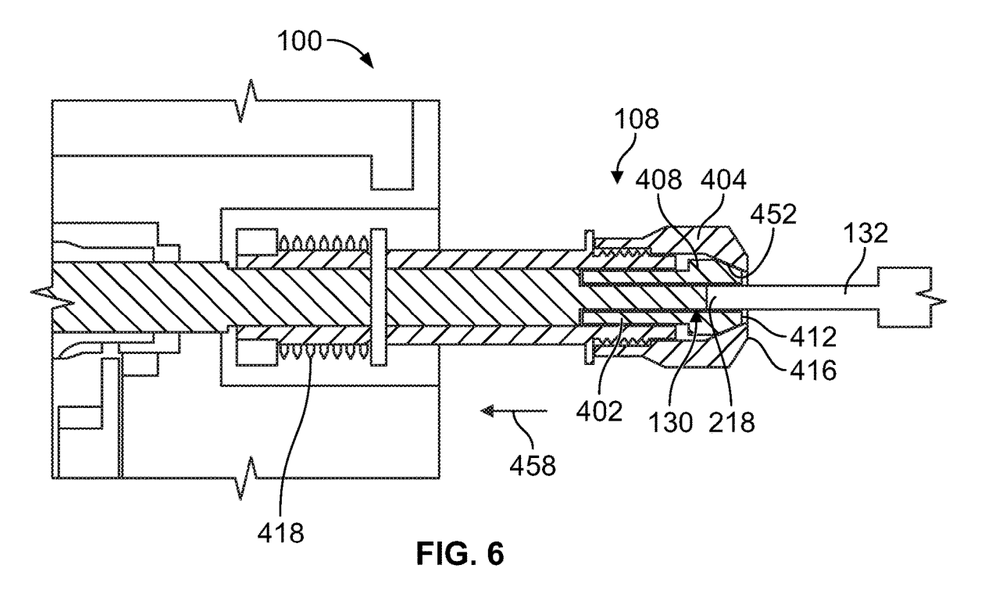
FIG. 6 is a side cross-sectional view of the portion of the wire preparation device shown in FIG. 5 showing the wire secured within the channel of the wire spinner.

FIG. 5 is a side cross-sectional view of a portion of the wire preparation device 100 showing a wire 132 being loaded into the channel 130 of one of the wire spinners 108 according to an embodiment. FIG. 6 is a side cross-sectional view of the portion of the wire preparation device 100 shown in FIG. 5 showing the wire 132 secured within the channel 130 of the wire spinner 108. The outer collar 404 is in the retracted position in FIG. 5, and is in the actuated position in FIG. 6.

In the assembled state of the wire spinner 108, the collet sleeve 402 is disposed within the interior cavity 414 of the outer collar 404. In an embodiment, the interior cavity 414 has a tapered shape towards the front end 416 of the collar 404. For example, an interior wall 452 of the collar 404 that defines the interior cavity 414 is conical. The slope of the interior wall 452 generally complements the conical outer perimeter along the distal tip 410 of the collet sleeve 402, and is configured to engage the distal tip 410. The interior wall 452 forces the cantilevered arms 408 of the collet sleeve 402 radially inward towards the channel 130. Due to the conical interior wall 452 and the conical outer perimeter of the collet sleeve 402, axial movement of the outer collar 404 relative to the collet sleeve 402 affects an amount of force exerted by the outer collar 404 on the collet sleeve 402 to contract the collet sleeve 402 radially inward.

Referring to FIG. 5, as the exposed segment 213 of the wire 132 is moved towards the opening 214 of the wire spinner 108 for loading, the outer collar 404 is moved to the retracted position. In an embodiment, the outer collar 404 is biased by the spring 418 (and the release shaft 420) towards the actuated position, so the outer collar 404 requires a manual force in an axial retracting direction 450 to move the outer collar 404 to the retracted position. In the retracted position, there is an axial gap between the front end 416 of the outer collar 404 and the front end 412 of the collet sleeve 402. Due to the conical shape of the interior wall 452 of the outer collar 404, the outer collar 404 allows the cantilevered arms 408 of the sleeve 402 to resile radially outward, which increases the size of the channel 130 for receiving the wire 132 therein.

Referring now to FIG. 6, once the wire 132 is received in the channel 130, the wire 132 is releasably secured within the channel 130 by moving the outer collar 404 to the actuated position. In the illustrated embodiment, the spring 418 forces the collar 404 in an axial actuating direction 458 that is opposite the retracting direction 450. Thus, due to the spring 418, an operator may simply release the outer collar 404 to allow the outer collar 404 to transition towards the actuated position relative to the collet sleeve 402. In an alternative embodiment, the outer collar 404 may be moved in the axial actuating direction 458 by rotating the outer collar 404 along helical threads (not shown) instead of using the spring 418 to provide a spring force. In the actuated position, the front end 416 of the outer collar 404 approximately aligns with the front end 412 of the collet sleeve 402, such that there is a reduced axial gap, if at all, between the front ends 416, 412. The rearward movement of the outer collar 404 relative to the sleeve 402 causes the interior wall 452 of the collar 404 to force the cantilevered arms 408 to contract radially inward, reducing the size of the channel 130. The contracting arms 408 clamp around the wire 132 within the channel 130, securing the wire 132 within the channel 130. The end 218 of the wire 132 is secured within the channel 130 such that rotation of the collet sleeve 402 causes the end 218 of the wire 132 to rotate as well.

Figure 7:
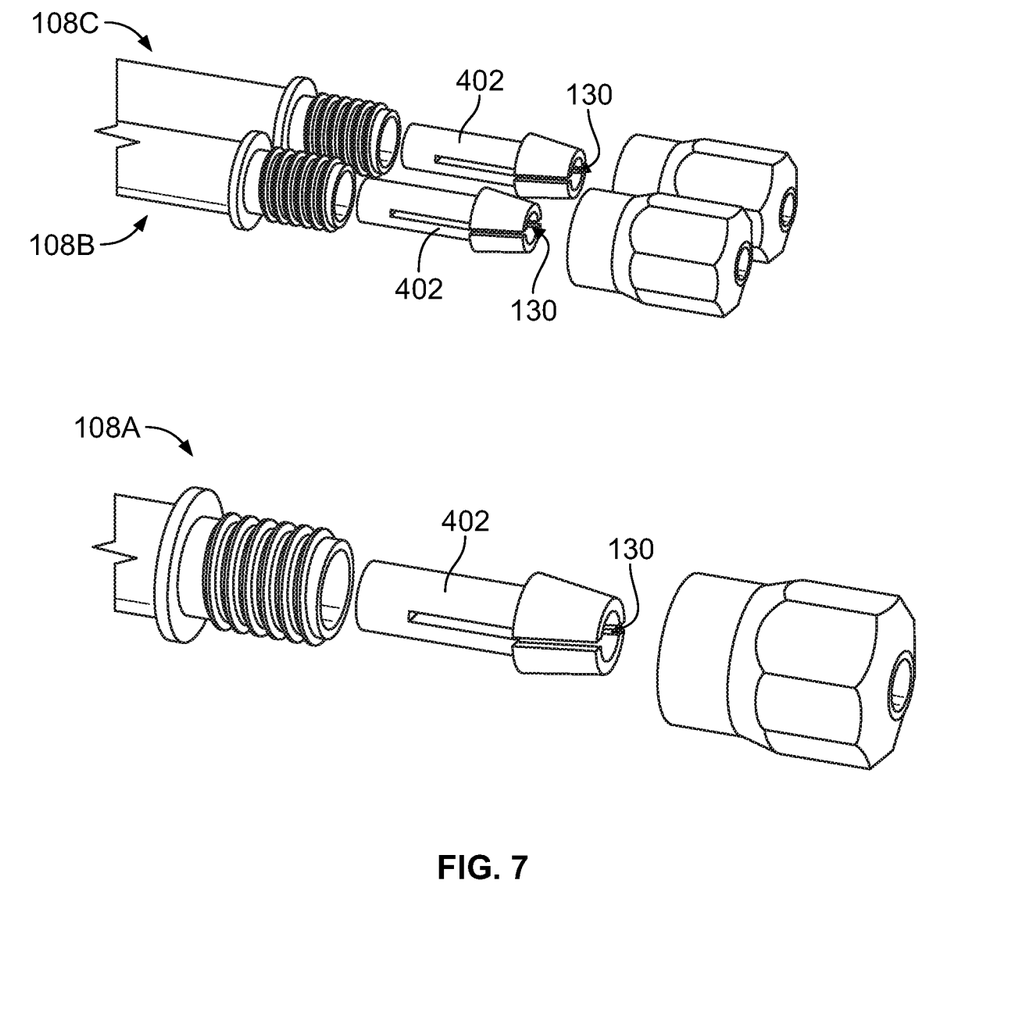
FIG. 7 is a perspective view showing exploded sections of multiple wire spinners of the wire preparation device according to an embodiment.

FIG. 7 is a perspective view showing exploded sections of the wire spinners 108A, 108B, 108C according to an embodiment. For example, the two straightening wire spinners 108B, 108C are identical to each other, having the same components and sizes. The untwisting wire spinner 108A in an embodiment is similar to the straightening wire spinners 108B, 108C, but differs from the spinners 108B, 108C with respect to size. For example, the collet sleeve 402 of the untwisting wire spinner 108A is larger than the collet sleeves 402 of the straightening wire spinners 108B, 108C. As a result, the channel 130 defined by the sleeve 402 of the untwisting wire spinner 108A has a size that accommodates both of the wires 132 in the twisted pair 220 (shown in FIG. 2B) at the same time for separating the twisted wires 132. The smaller channels 130 defined by the sleeves 402 of the straightening wire spinners 108B, 108C have sizes that each accommodate only one of the wires 132 at a time for straightening the corresponding individual wires 132.

Figure 8:
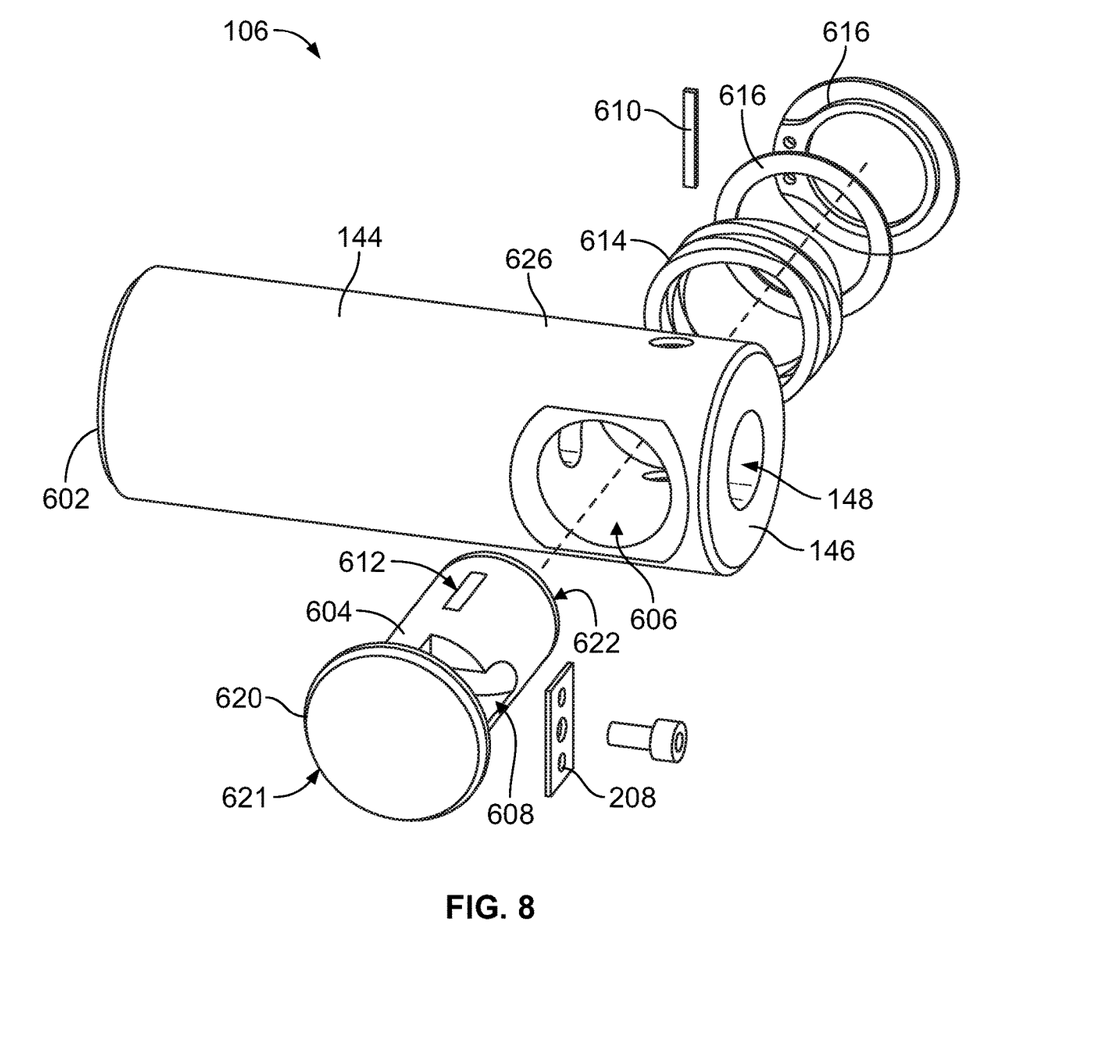
FIG. 8 is an exploded perspective view of a jacket stripper of the wire preparation device according to an embodiment.

FIG. 8 is an exploded perspective view of the jacket stripper 106 according to an embodiment. The cylindrical housing 144 extends between the cable end 146 and an opposite motor end 602. The motor end 602 is coupled to an output shaft 310 of the power coupling components 124, as shown in FIG. 3. In an embodiment, the blade 208 of the jacket stripper 106 is held by a spring-loaded plunger 604 mounted to the cylindrical housing 144. The plunger 604 is generally cylindrical. The plunger 604 extends through a transverse opening 606 in the cylindrical housing 144, such that the plunger 604 within the opening 606 extends transversely across the socket 148. The blade 208 is mounted within an aperture 608 that extends through the plunger 604. The aperture 608 at least partially aligns with the socket 148 when the jacket stripper 106 is assembled.

The plunger 604 is movable relative to the cylindrical housing 144. The plunger 604 is retained in the opening 606 via a pin 610 that extends through the cylindrical housing 144 and through an elongated slot 612 in the plunger 604. The plunger 604 is able to move a distance permitted by the pin 610 engaging ends of the slot 612. In an embodiment, the jacket stripper 106 includes a coil spring 614 and one or more annular retainer rings 616 that engage the plunger 604. The spring 614 biases the plunger 604 in a direction that forces the blade 208 into alignment with the socket 148 for engaging the cable jacket 202 of the cable 114 within the socket 148. For example, the plunger 604 includes a flange 620 at a first end 621, and the slot 612 is disposed proximate to an opposite second end 622 of the plunger 604. The spring 614 is loaded onto the plunger 604 at the second end 622 and is disposed between an outer surface 626 of the cylindrical housing 144 and the one or more retainer rings 616.

Figure 9:
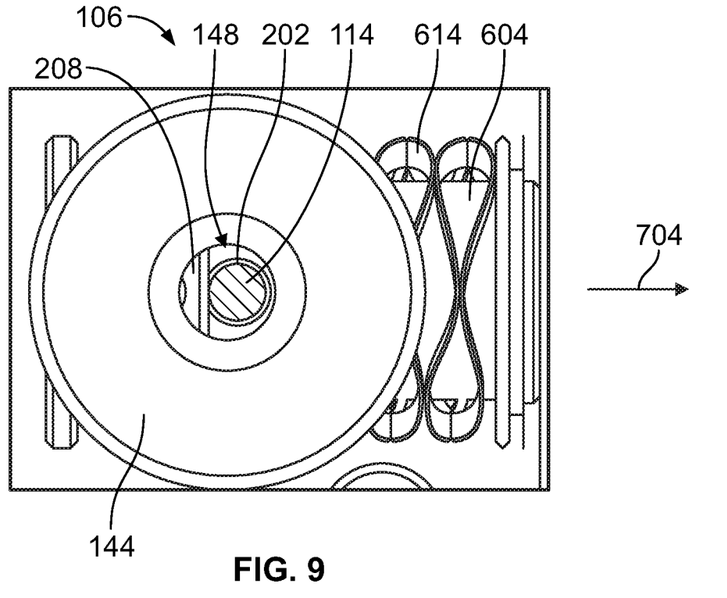
FIG. 9 is a front view of the jacket stripper with a spring-loaded plunger in a cutting position according to an embodiment.
Figure 10:
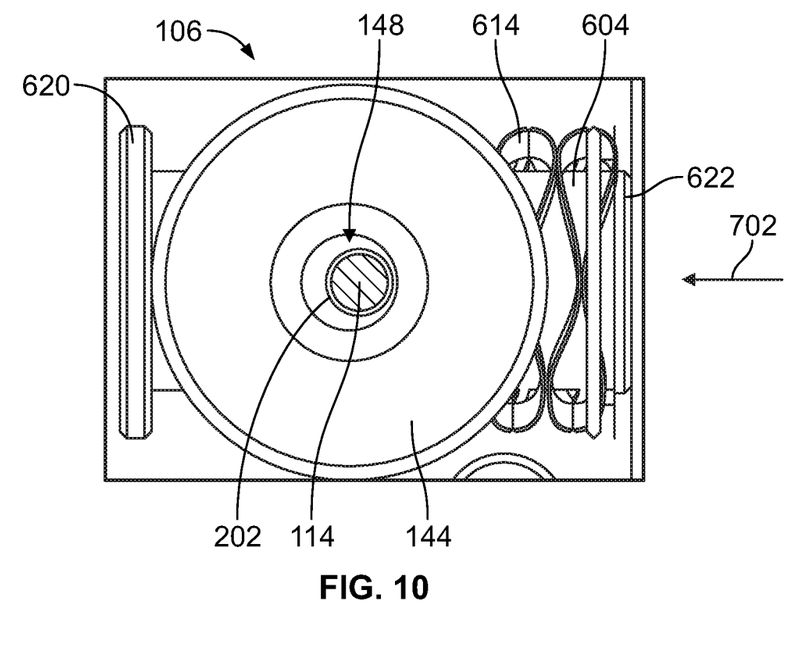
FIG. 10 is a front view of the jacket stripper with the spring-loaded plunger in a retracted position according to an embodiment.

FIG. 9 is a front view of the jacket stripper 106 with the spring-loaded plunger 604 in a cutting position according to an embodiment. As shown in FIG. 9, the blade 208 on the plunger 604 extends at least partially into alignment with the socket 148. FIG. 10 is a front view of the jacket stripper 106 with the spring-loaded plunger 604 in a retracted position according to an embodiment. In the retracted position, the blade 208 does not extend into alignment with the socket 148, such that the blade 208 is not visible in FIG. 10. In an embodiment, the spring 614 biases the plunger 604 towards the cutting position shown in FIG. 9.

To load the cable 114 into the socket 148 for stripping the cable jacket 202, the plunger 604 is manually moved from the cutting position to the retracted position by forcing the plunger 604 in an opening direction 702. For example, an operator may push the second end 622 of the plunger 604 in the opening direction 702, or may pull the flange 620 in the opening direction 702. The cable 114 is loaded into the socket 148 when the plunger 604 is in the retracted position and the blade 208 does not obstruct entry into the socket 148. After the cable 114 is loaded, the plunger 604 is allowed to move to the cutting position. For example, the spring 614 forces the plunger 604 in a closing direction 704. As the plunger 604 moves in the closing direction 704, the blade 208 moves into the socket 148 and engages the perimeter of the cable jacket 202, as shown in FIG. 9. The spring 614 holds the blade 208 in contact with the cable jacket 202.

Once the plunger 604 is in the cutting position, activation of the motor 102 (shown in FIG. 1) causes the entire jacket stripper 106 to rotate relative to the cable 114. Thus, the cylindrical housing 144 and the plunger 604 rotate about the cable 114 in the socket 148. The blade 208 moves along an entire perimeter of the cable jacket 202, making an annular laceration on the jacket 202 which severs the distal segment 210 (shown in FIG. 2A) of the cable jacket 202 from the remainder of the cable 114. After the motor 102 is deactivated, the cable 114 can be removed from the jacket stripper 106 by manually moving the plunger 604 back to the retracted position, and pulling the cable 114 from the socket 148. The operator may remove the severed distal segment 210 of the cable jacket 202 from the cable 114 to yield the stripped end portion 212 (FIG. 2).

The wire preparation device 100 in the embodiments described above include three wire spinners 108, with some of two of the wire spinners 108B, 108C used for straightening individual wires and one of the wire spinners 108A used for separating a twisted pair of wires. However, in other embodiments, the wire preparation device 100 may include more or less than three wire spinners 108. For example, the wire preparation device 100 may include only one wire spinner 108 or only two wire spinners 108. It is also recognized that the wire preparation device 100 in other embodiments may not include the jacket stripper 106. For example, the wire preparation device 100 in one alternative embodiment may include multiple wire spinners 108 and omits the jacket stripper 106. Therefore, it is understood that the wire preparation device 100 is not limited to the embodiments shown and described with reference to FIGS. 1-10.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A wire preparation device comprising:
   a motor;
   a device housing having a front end, the device housing coupled to the motor rearward of the front end;
   a wire spinner held by the device housing and mechanically connected to the motor via power coupling components, the wire spinner extending to a wire end that protrudes from the front end of the device housing, the wire spinner including a collet sleeve defining a channel configured to receive an end of one or more wires of a cable therein through an opening at the wire end, the wire spinner further including an outer collar surrounding the collet sleeve and movable relative to the collet sleeve along a spinning axis of the wire spinner between a retracted position and an actuated position, the outer collar in the actuated position forcing the collet sleeve to contract radially inward to releasably secure the one or more wires within the channel,
   wherein the wire spinner is configured to be rotated about the spinning axis by the motor relative to the device housing to one or more of untwist or straighten the one or more wires of the cable that are releasably secured within the collet sleeve; and
   a jacket stripper coupled to the motor, the jacket stripper including a housing protruding beyond the front end of the device housing at a spaced apart location from the wire spinner, the housing defining a socket configured to receive an end of a cable therein, the jacket stripper further including a blade, wherein the jacket stripper is rotated by the motor relative to the cable for the blade to cut the cable jacket along an entire perimeter of the cable jacket.

2. The wire preparation device of claim 1, wherein the one or more wires of the cable that are releasably secured within the collet sleeve include a twisted pair of wires and rotation of the wire spinner untwists the twisted pair of wires.

3. The wire preparation device of claim 1, wherein the wire spinner is a first wire spinner in a pair of straightening wire spinners, the wire preparation device further including a second wire spinner in the pair of straightening wire spinners that is identical to the first wire spinner and adjacent to the first wire spinner along the front end of the device housing, wherein the first and second wire spinners are rotated at the same time by the motor to individually straighten different wires.

4. The wire preparation device of claim 1, wherein the power coupling components include a motor coupler, a driver gear, and a follower gear, the motor coupler mechanically connected between the motor and the driver gear, the follower gear intermeshed with the driver gear and mechanically connected to the wire spinner, wherein rotation of the motor coupler by the motor rotates the wire spinner via the driver gear and the follower gear.

5. The wire preparation device of claim 1, wherein the collet sleeve is segmented by multiple kerf cuts spaced apart along a circumference of the collet sleeve, the collet sleeve having a conical outer perimeter that engages an interior wall of the outer collar, wherein axial movement of the outer collar relative to the collet sleeve forces the collet sleeve to contract radially inward.

6. The wire preparation device of claim 1, wherein the blade of the jacket stripper is held by a spring-loaded plunger that is biased to force the blade into engagement with the cable jacket of the cable within the socket.

7. The wire preparation device of claim 1, wherein the power coupling components include a motor coupler, a driver gear, and first and second follower gears intermeshed with the driver gear, the motor coupler mechanically connected between the motor and the driver gear, the first follower gear mechanically connected to the wire spinner, the second follower gear mechanically connected to the jacket stripper, wherein rotation of the motor coupler by the motor rotates the wire spinner and the jacket stripper at the same time via the driver gear and the first and second follower gears.

8. The wire preparation device of claim 1, wherein the outer collar is mechanically connected to a coil spring within the device housing via a release shaft, the coil spring biasing the outer collar towards the actuated position.

9. The wire preparation device of claim 1, wherein the wire spinner is an untwisting wire spinner configured to untwist two wires in a twisted pair of wires at the same time, and
the wire preparation device further includes at least one straightening wire spinner held by the device housing and mechanically connected to the motor, each straightening wire spinner protruding beyond the front end of the device housing at a spaced apart location from the untwisting wire spinner, the straightening wire spinner including a collet sleeve that defines a channel having a smaller dimension than the channel of the untwisting wire spinner, wherein rotation of the straightening wire spinner is configured to straighten an individual wire that is received into the channel thereof.

10. A wire preparation device comprising:
a device housing having a front end, the device housing configured to couple to a motor rearward of the front end;
power coupling components configured to mechanically connect to the motor; and
multiple wire spinners held by the device housing and configured to be rotated relative to the device housing by the motor via the power coupling components, the wire spinners having respective wire ends that protrude from the front end of the device housing at spaced apart locations along the front end, the wire spinners each including a collet sleeve defining a channel that is open at the wire end and configured to receive an end of one or more wires of a cable therein, each wire spinner further including an outer collar surrounding the respective collet sleeve and movable relative to the collet sleeve between a retracted position and an actuated position,
wherein the outer collar moving towards the actuated position forces the collet sleeve to contract radially inward, reducing the size of the respective channel, to releasably secure the one or more wires within the respective channel, and
wherein the wire spinners include an untwisting wire spinner and at least one straightening wire spinner, the channel of the untwisting wire spinner having a larger dimension than the respective channel of each straightening wire spinner.

11. The wire preparation device of claim 10, wherein the power coupling components rotate all of the wire spinners at the same time during operation of the motor.

12. The wire preparation device of claim 10, wherein rotation of the untwisting wire spinner is configured to untwist a pair of two wires within the channel of the untwisting wire spinner, and rotation of each straightening wire spinner is configured to individually straighten a single wire within the channel of the straightening wire spinner.

13. The wire preparation device of claim 12, wherein the wire preparation device includes two straightening wire spinners that are disposed side-by-side along the front end of the device housing, wherein the two straightening wire spinners are rotated at the same time and are each configured to individually straighten a single wire within the respective channel thereof.

14. The wire preparation device of claim 10, wherein the power coupling components include a gear set having a driver gear and multiple follower gears individually intermeshed with the driver gear, the driver gear configured to be connected to the motor via a motor coupler, each of the follower gears mechanically connected to a different one of the wire spinners such that rotation of the motor coupler by the motor rotates the wire spinners at the same time via the gear set.

15. The wire preparation device of claim 10, further comprising a jacket stripper held by the device housing and mechanically connected to the power coupling components, the jacket stripper including a cylindrical housing including a cable end protruding beyond the front end of the device housing at a spaced apart location from the wire spinners, the cylindrical housing defining a socket at the cable end configured to receive an end of a cable therein, the jacket stripper further including a blade held within the socket, wherein the jacket stripper is configured to be rotated relative to the device housing and the cable by the motor via the power coupling components such that the blade cuts a cable jacket of the cable within the socket along an entire perimeter of the cable jacket.

16. The wire preparation device of claim 15, wherein the jacket stripper further includes a spring-loaded plunger mounted to the cylindrical housing and extending transversely across the socket, the spring-loaded plunger holding the blade and biased via a spring to force the blade into engagement with the cable jacket of the cable within the socket.

17. The wire preparation device of claim 10, wherein the outer collar of each wire spinner is mechanically connected to a corresponding coil spring within the device housing via a corresponding release shaft for biasing the outer collar towards the actuated position.

18. The wire preparation device of claim 10, wherein the collet sleeve of each wire spinner is segmented by multiple kerf cuts spaced apart along a circumference of the collet sleeve, each collet sleeve having a conical outer perimeter that engages an interior wall of the corresponding outer collar, wherein axial movement of the outer collar relative to the collet sleeve forces the collet sleeve to contract radially inward.

19. A wire preparation device comprising:
a motor;
a device housing having a panel; and
multiple wire preparation stations disposed within the device housing and mechanically connected to the motor via power coupling components, wherein the wire preparation stations include at least two different types of wire preparation stations selected from the group consisting of an untwisting wire spinner, a straightening wire spinner, and a jacket stripper, the at least two different types of wire preparation stations having one or more of different sizes, shapes, numbers, or types of components relative to each other, wherein the wire preparation stations protrude through the panel of the device housing at spaced apart locations and define respective openings for receiving one or more wires therein,
wherein each of the multiple wire preparation stations is configured to be rotated by the motor relative to the device housing via the power coupling components.

20. The wire preparation device of claim 19, wherein the opening of a first wire preparation station of the wire preparation stations has a larger dimension than the opening of a second wire preparation station of the wire preparation stations.

* * * * *